Figure 1:
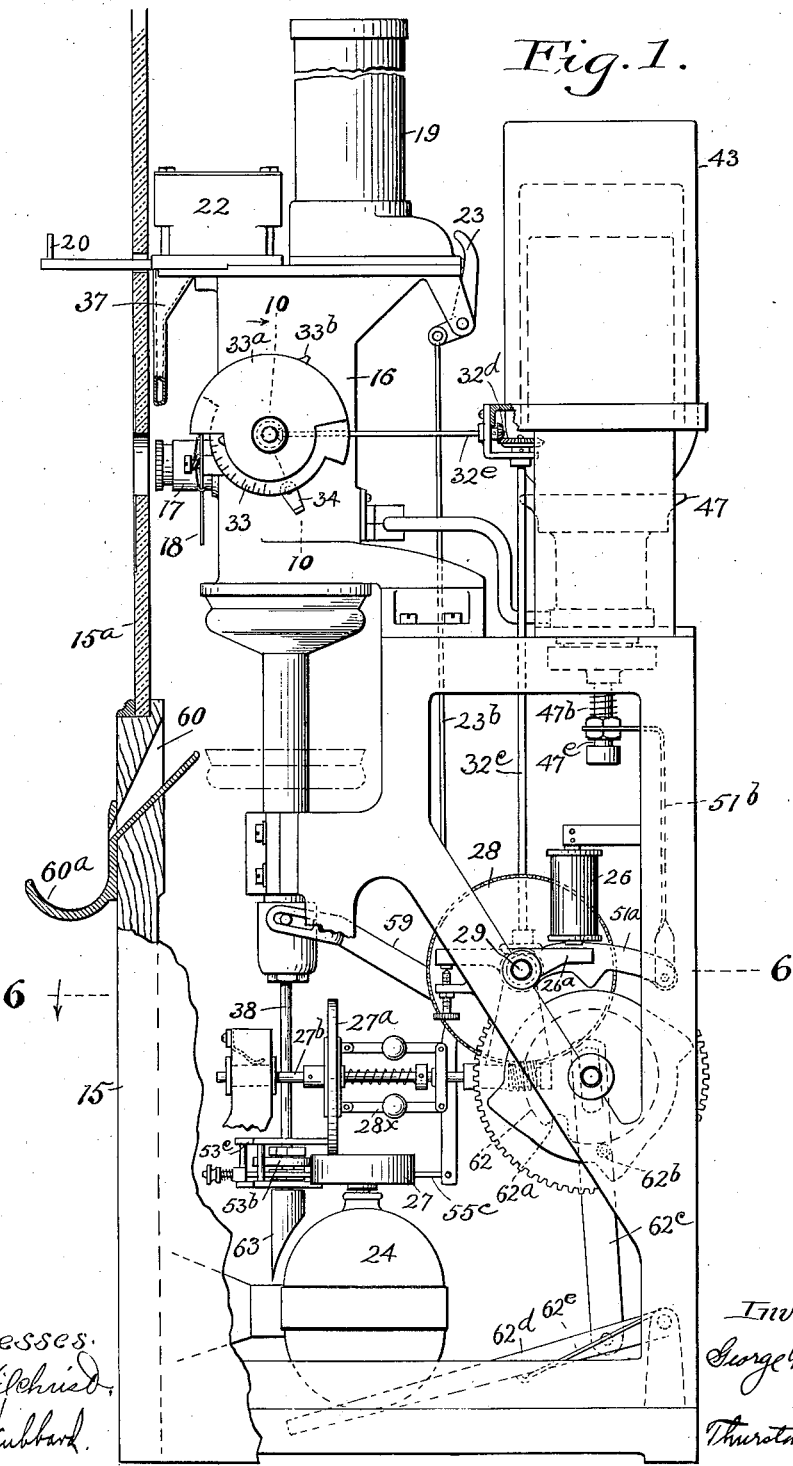

G. N. PIFER.
AUTOMATIC PHOTOGRAPHING APPARATUS.
APPLICATION FILED NOV. 8, 1912.

1,167,314.

Patented Jan. 4, 1916.
6 SHEETS—SHEET 1.

G. N. PIFER.
AUTOMATIC PHOTOGRAPHING APPARATUS.
APPLICATION FILED NOV. 8, 1912.

1,167,314.

Patented Jan. 4, 1916.
6 SHEETS—SHEET 3.

G. N. PIFER.
AUTOMATIC PHOTOGRAPHING APPARATUS.
APPLICATION FILED NOV. 8, 1912.
1,167,314.
Patented Jan. 4, 1916.
6 SHEETS—SHEET 5.
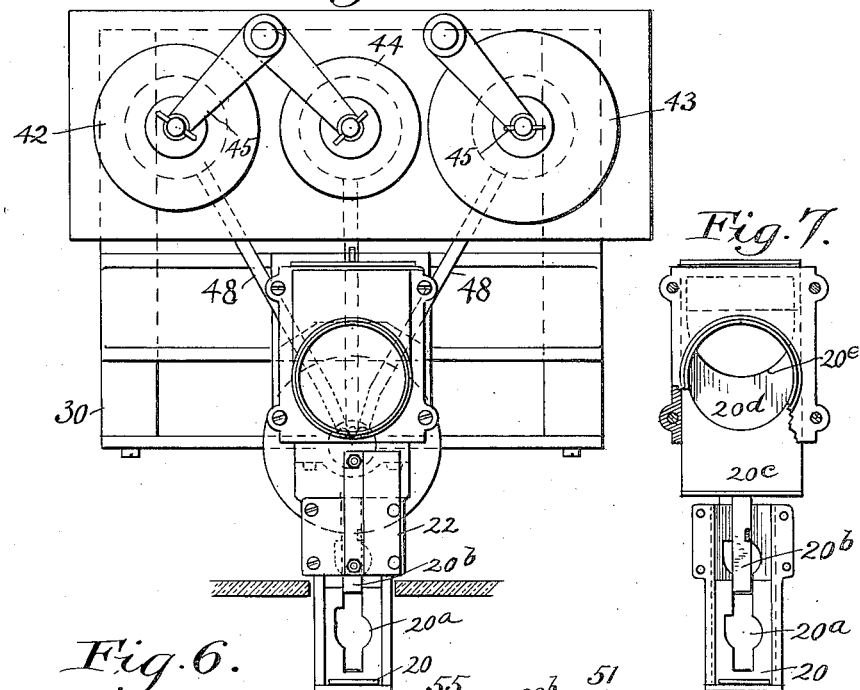
Fig. 5.
Fig. 7.
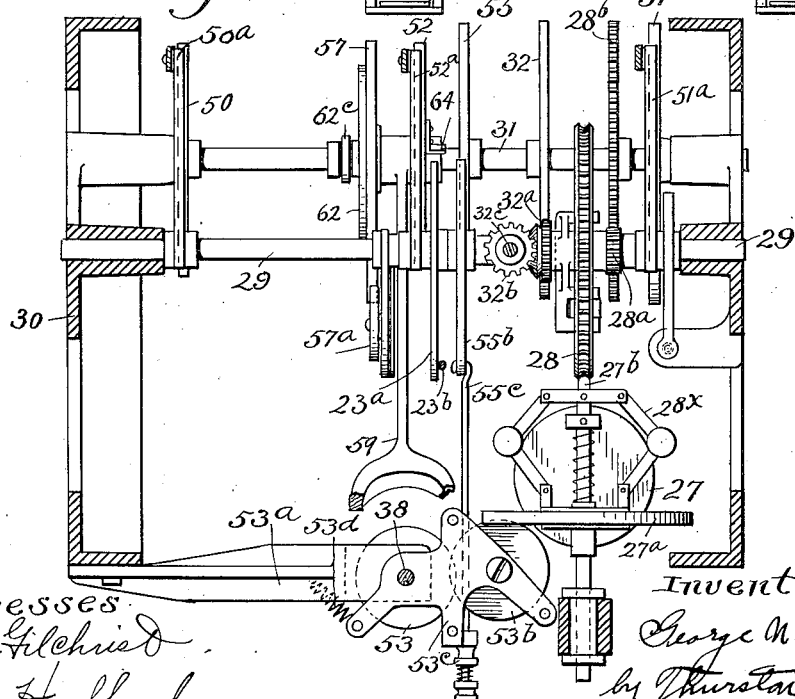
Fig. 6.
Witnesses
E. B. Gilchrist
N. C. Hubbard
Inventor
George N. Pifer
by Thurston & Kwis
Attys.

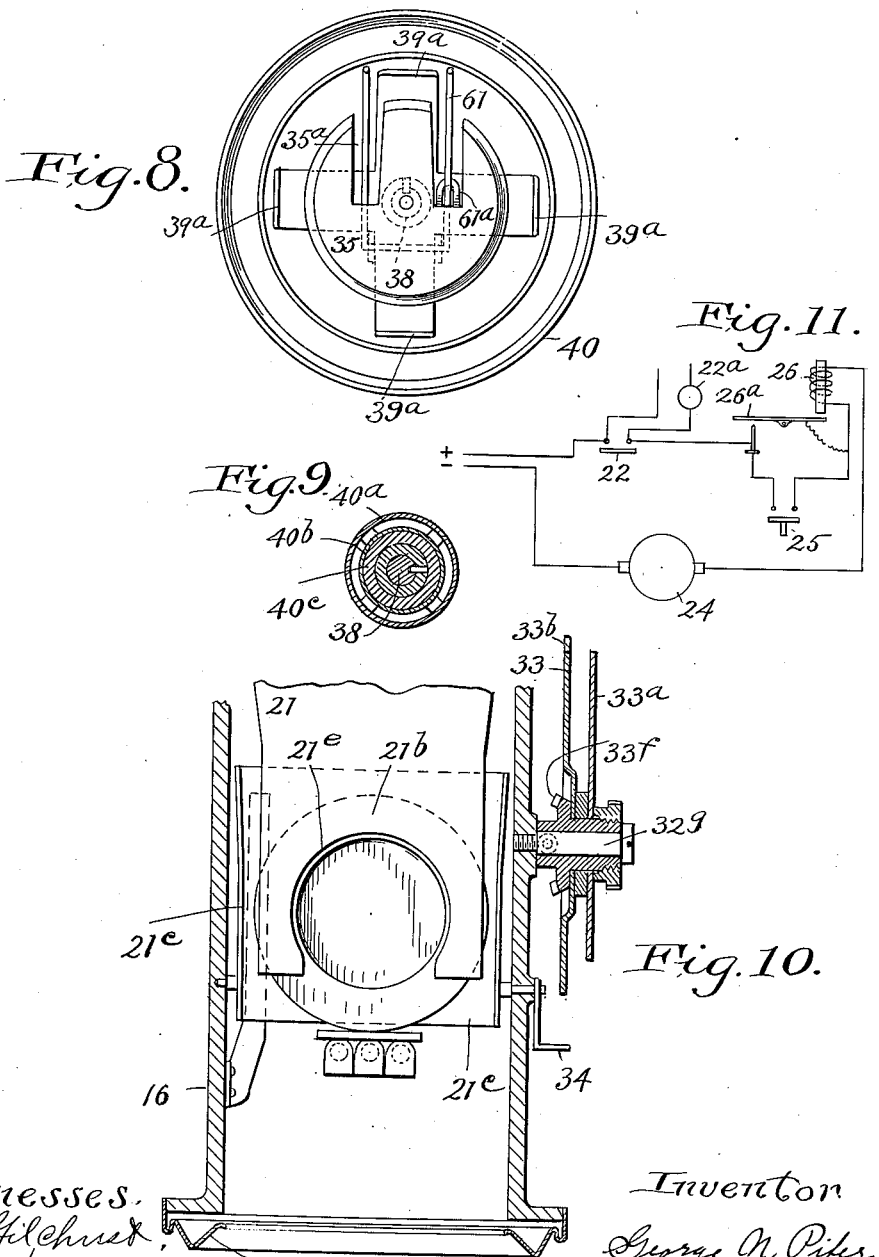

UNITED STATES PATENT OFFICE.

GEORGE N. PIFER, OF CLEVELAND, OHIO, ASSIGNOR, BY MESNE ASSIGNMENTS, TO THE AUTO PORTRAIT COMPANY, OF CLEVELAND, OHIO, A CORPORATION OF OHIO.

AUTOMATIC PHOTOGRAPHING APPARATUS.

1,167,314. Specification of Letters Patent. Patented Jan. 4, 1916.

Application filed November 8, 1912. Serial No. 730,198.

*To all whom it may concern:*

Be it known that I, GEORGE N. PIFER, a citizen of the United States, residing at Cleveland, in the county of Cuyahoga and State of Ohio, have invented a certain new and useful Improvement in Automatic Photographing Apparatus, of which the following is a full, clear, and exact description.

This invention relates to automatic photographing apparatus or machines, and has for its chief objects the provision of a machine of this character wherein there are embodied high efficiency, simplicity of construction, and economy both in construction and operation, and which produces a more satisfactory photograph and in a shorter space of time than is possible with all prior machines with which I am familiar.

The present invention resides particularly in that part of the apparatus which is utilized in the finishing process, and particularly in the means which I employ for subjecting the plate to the action of the finishing and rinsing solutions, and for subsequently removing the solutions from the plate.

A further important feature of my invention which is closely associated with that specifically mentioned above, is means which enable me to subject the plate to actinic rays for a second or reëxposure without the necessity of employing artificial light producing means for this particular purpose.

In carrying out the above mentioned salient features of my invention, which is preferably employed in the so-called reëxposure or redevelopment process for producing from a sensitized plate a positive picture, the solutions which are utilized in the finishing process are successively delivered onto the plate and at proper intervals of time, and each solution is quickly and uniformly removed from all parts of the plate by the action of centrifugal force created by spinning the plate after a solution has been applied thereon.

The above and other features constitute my invention which may be here briefly summarized as consisting in certain novel details of construction and combinations and arrangements of parts which will be described in the specification and set forth in the appended claims.

Figure 2:
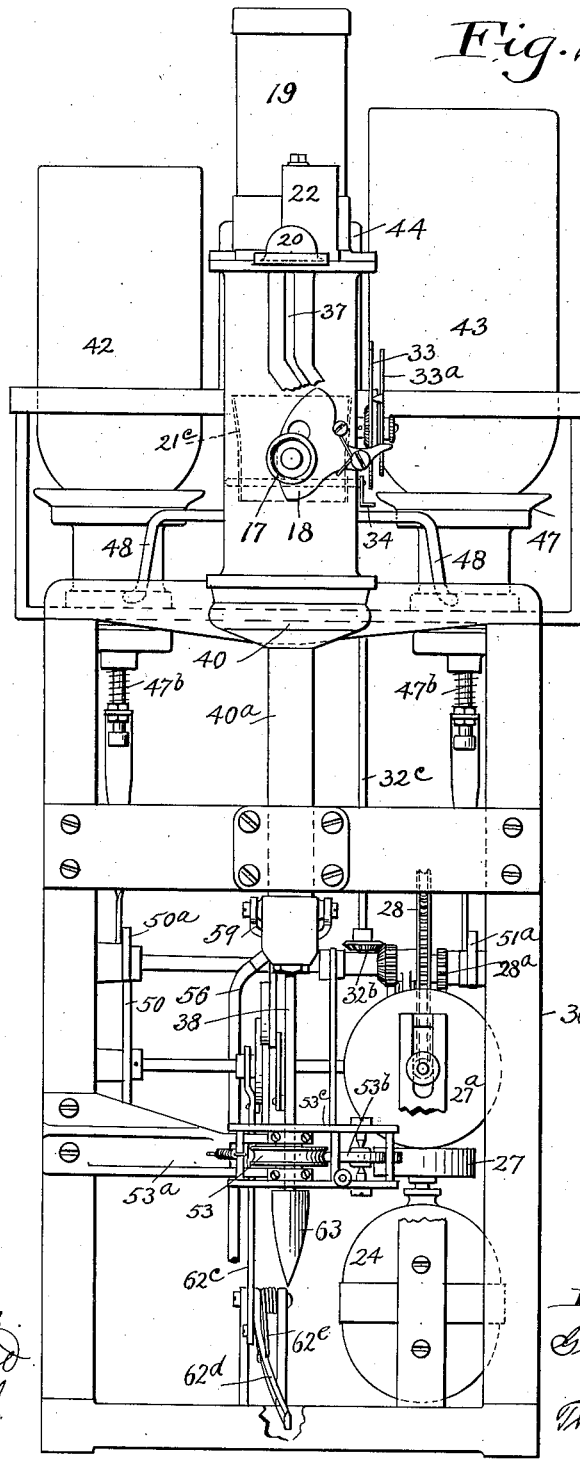
Figure 3:
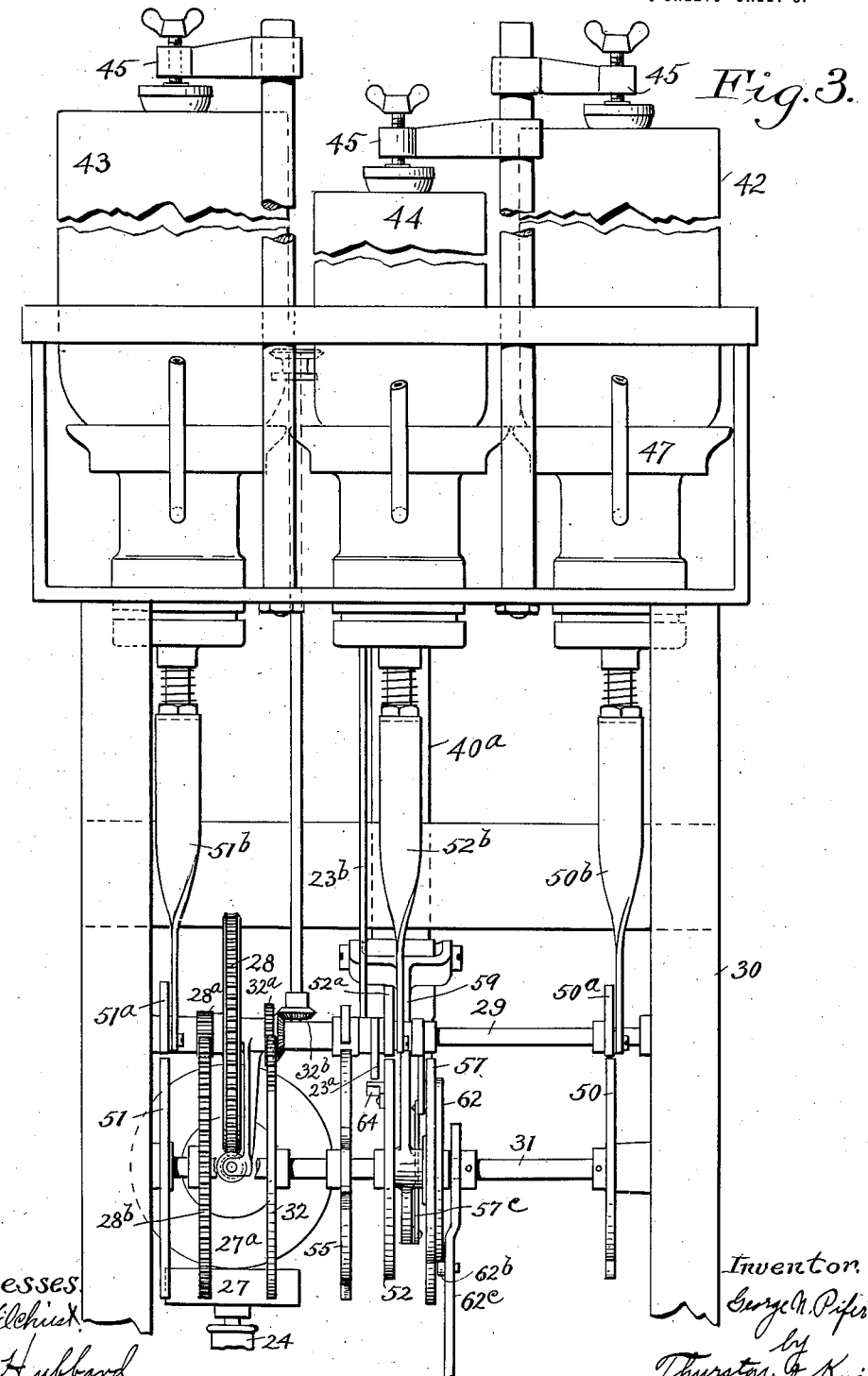
Figure 4:
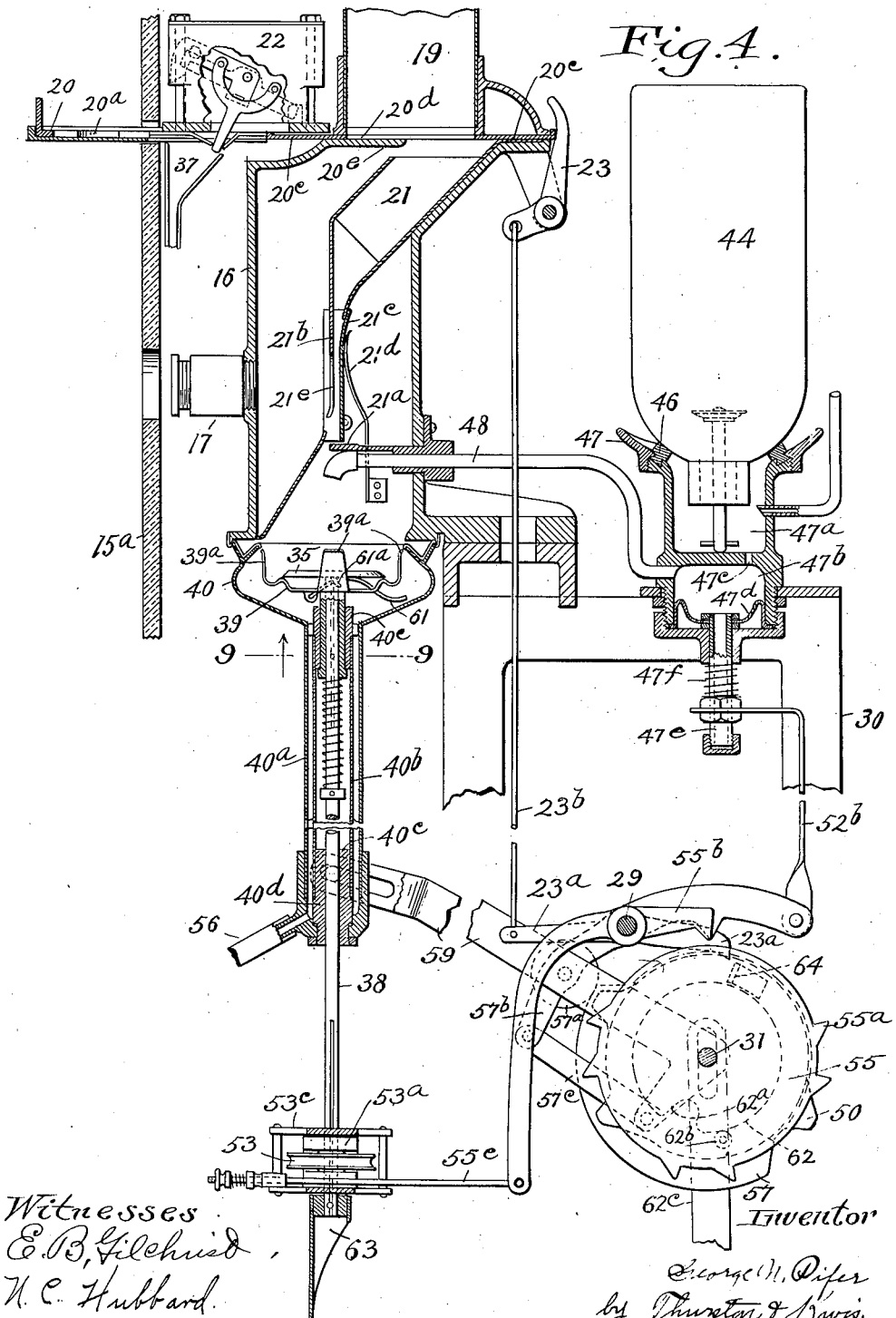

In the accompanying sheets of drawings wherein I have shown one form of my invention which answers the requirements very effectively, Figure 1 is a side elevation of the photographing apparatus with portions of the casing removed, and other portions in section; Fig. 2 is a front view with the casing removed; Fig. 3 is a rear view of the upper portion of the same on a slightly enlarged scale; Fig. 4 is a longitudinal sectional view of that part of the apparatus shown in Fig. 3, with certain portions broken away and removed; Fig. 5 is a top plan view of the same; Fig. 6 is a transverse sectional view substantially along the irregular line 6—6 of Fig. 1, looking in the direction indicated by the arrows; Fig. 7 is a detached view of portion of the coin controlled slide mechanism; Fig. 8 is a detached top plan view of the cup and plate holding device which supports the plate throughout the finishing process. Fig. 9 is a transverse sectional view substantially along the line 9—9 of Fig. 4 looking in the direction indicated by the arrow; Fig. 10 is a detail sectional view substantially along the irregular line 10—10 of Fig. 1, showing a portion of the shutter operating mechanism and of the mechanism for supporting the plate in the focal plane of the camera, and for subsequently causing the plate to be moved from such position onto the device which receives and holds the plate during the finishing process; Fig. 11 is a diagrammatic view illustrating in simplified form the electrical connections which are utilized in controlling the motor and, if desired, also, the lamp, which may be used in making the first and second exposures.

The machine as an entirety, including the features which are believed to be new with me, and others which are well known at least in a generic sense, includes the camera proper and coin controlled mechanism for delivering to the camera in focal position a sensitized plate from a suitably situated plate magazine; it includes also finishing apparatus comprising a suitable motor which when set into operation causes the actuation of the shutter mechanism, and hence the first or main exposure, and subsequent delivery of the exposed plate to a device which receives and holds the plate throughout the finishing process; thence the motor through properly timed and constructed operating mechanism causes the delivery to the plate at proper intervals and in proper sequence, the developing, rinsing and bleaching solutions, and after the delivery of each solution, causes the solution to be thrown from the plate by centrifugal force produced by rapidly spinning the plate. Additionally, the motor, during the finishing process, lowers the plate holding device and with it the plate from the light-tight inclosure in which the first development took place, so that the plate will be subjected to actinic rays from an external source for the second or reëxposure. Finally, the apparatus causes the ejection of the finished picture from the machine and restores all parts to normal position for the next sequence of photographing steps or operations.

Referring now to the several figures of the drawings, it will be seen that the apparatus includes an outer inclosing casing 15, only a portion of which is shown. The upper front part of the casing is preferably provided with a glass plate 15ª or other medium, through which actinic rays may pass to the interior of the casing onto the plate for the second exposure.

The operating portion of the apparatus within the casing includes a camera comprising mainly a box or compartment 16, which is normally closed and light tight, a lens and lens holding portion 17, a shutter 18, and means hereinafter referred to for supporting and holding a plate in the focal plane of the lens. Above the camera there is provided a magazine 19 adapted to contain a stack of circular plates which are to be fed successively to the camera. The plates are caused to be fed from the magazine 19 by a coin controlled slide mechanism including a slide 20 which projects outwardly through the glass 15ª of the casing above the camera, and which is provided with an opening 20ª, see Figs. 4 and 7, for receiving a coin. A second slide or slide member 20ᵇ is adapted to be moved inwardly when the slide 20 is actuated, and when the opening 20ª contains the coin, the coin forming the operating connection between the slides 20 and 20ᵇ. The slide 20ᵇ is arranged between the slide 20, and a third slide or slide member 20ᶜ having a circular opening 20ᵈ which is normally in line with the circular plates in the magazine and is slightly larger than the opening so that when the slide is in normal position, the lowermost plate of the stack in the magazine fills or is located in said opening 20ᵈ.

When the three slides or slide members are operated or moved inwardly with the coin in the opening 20ª and forming the connection between the first and second slide members, the lowermost plate in the magazine is moved rearwardly, and when it passes beyond a shelf 20ˣ, said plate drops into a chute 21, passes down said chute until it reaches and is stopped by a platform 21ª which holds the plate in the focal plane of the lens with the sensitized side of the plate facing forwardly. The plate is then between a metal strip 21ᵇ forming the forward wall of the chute 21 and a pivotally supported back plate 21ᶜ which is normally held in the position shown in Fig. 4 by a spring 21ᵈ. The plate 21ᵇ is provided with a substantially U-shaped opening 21ᵉ, so as not to obstruct the passage of light from the lens to the plate (see Fig. 10).

As the coin controlled slide mechanism is operated, a switch 22 (see Figs. 1 and 4) is closed, and a bell crank 23 which is at the rear of the plate magazine is rocked about its pivotal support so as to rock a lever 23ª which is connected to one arm of the bell crank 23 by a rod 23ᵇ.

While it is immaterial, as far as certain features of my invention are concerned, what particular character of motor is employed, I prefer for numerous reasons which need not be here explained, to employ an electric motor shown in Fig. 1 at 24.

The switch 22 may perform two functions. It may be utilized for controlling a lamp 22ª which under certain conditions will be used for producing a light for exposing purposes, which lamp is separate from and outside of the casing 15, and it further serves to control in part the motor 24, for starting into operation the motor driven parts of the apparatus.

As will be seen from Fig. 11, the closure of the switch 22 does not at once start the operation of the motor, although it does close the lamp circuit. It is not until the operator closes a second switch 25 which may be an ordinary push button switch that the motor circuit is completed. As soon as the motor circuit is completed, a magnet 26 attracts an armature 26ª and short circuits the switch 25 so that the opening of the motor circuit will take place as soon as the switch 22 is opened. The operator will close the push button switch 25 when he is ready or prepared for the exposure. As soon as the motor starts into operation, the shutter 18 is shifted so as to open the camera and permit the first or photographic exposure to be made. The shutter is operated in the following manner: The motor 24 which may be supported in any suitable manner drives a friction wheel 27 which drives a friction disk 27ª arranged to drive a horizontal shaft 27ᵇ. The disk 27ª is slidingly arranged upon the shaft 27ᵇ so that it may be shifted along said shaft inwardly and outwardly toward or away from the center of the driving wheel 27 through a speed controlling governor 28ˣ. The rear end of the shaft 27ᵇ is provided with a worm which engages and drives a worm wheel 28 loosely mounted upon a rod 29 carried by a frame 30 which supports the major portion of the operating mechanism of the apparatus. The worm wheel 28 has connected to it a pinion 28$^a$ which drives a gear 28$^b$ which is secured to a main operating shaft 31 rotatably supported by the frame 30 and extending across the lower rear side of the frame. This shaft 31 which is driven continuously from the time that the motor is started into operation until the finished picture is ejected from the machine, is provided with a mutilated gear or gear segment 32 having teeth extending only throughout a portion of its periphery. This mutilated gear 32 drives a pinion 32$^a$ which through bevel gearing 32$^b$ drives a vertical shaft 32$^c$, which through other bevel gearing 32$^d$ drives a horizontal forwardly extending shaft 32$^e$, which extends alongside the camera box 16 and operates the shutter 18. This shaft through bevel gearing 32$^b$ rotates a sleeve which is mounted upon a stud 32$^g$ extending outwardly from the side of the camera box, as best shown in Fig. 10, and which carries two rotary shutter controlling disks 33 and 33$^a$, the outer disk 33$^a$ being adjustable relative to the inner disk and the position of adjustment of this outer disk determining the length of the exposure. Each of these two disks is provided with an arc-shaped notch forming two shoulders, as best shown in Fig. 1, the two shoulders of each disk being nearly 180° apart. When the motor through the described mechanism, starts to turn the disks 33 and 33$^a$, the projecting end of the shutter which normally bears against the inner disk 33 rides off one of the shoulders of the inner disk and is stopped by the outer disk 33$^a$, a small spring causing the shutter to be moved in this manner, and when this takes place, the camera is opened. The camera remains opened, until the projecting end of the shutter reaches the shoulder on the outer disk 33$^a$ so that it can pass from engagement with said disk to the position shown in Fig. 2, whereupon the spring quickly throws the shutter farther in the same direction in which it was previously moved, causing the closure of the camera. The disks or plates 33 and 33$^a$ continue to rotate until they pass through a complete rotation and reach their previous or normal positions. However, before the completion of the rotation of the disks, a projecting portion or lug 33$^b$ on the inner disk 33 engages a crank like member 34, secured to one of the supporting trunnions of the rockable plate 21$^c$, which is at the rear of the sensitized plate, and assists in supporting the same in upright position when the plate is in the focal plane, as before stated. This lug 33$^b$ by engaging and rocking the crank 34 rocks the device 21$^c$, throwing forwardly the lower end of said device, and causing the now exposed plate to drop from the shelf 21$^a$ and to fall upon a horizontal disk 35 which supports the plate during the finishing process, as will be hereinafter described. Immediately after the exposed plate has been shifted from the position in the focal plane in the camera, and is moved off the shelf onto the disk 35, one of the shoulders of the inner plate 33 engages the projecting end of the shutter and moves said shutter from the position shown in Fig. 2 to its opposite extreme position with the camera again closed. When this occurs, the rotation of the disks 33 and 33$^a$ and of the operating shafts 32$^c$ and 32$^e$ ceases by reason of the fact that the toothed portion of the gear 32 moves out of engagement with the pinion 32$^a$.

After the slide is pushed inwardly by the operator, so as to cause a plate to be delivered from the magazine to the camera, the coin drops into a chute 37 and thence into a suitable receptacle not shown.

I shall now describe an important part of my invention consisting of the mechanism for finishing the plate and, particularly the mechanism for removing the finishing solutions from the plate. As before stated, the plate, after the exposure, is caused to drop onto a disk 35. The plate is delivered from the camera onto the disk 35 in such a manner that it falls onto the disk with its sensitized side facing upwardly. This disk 35 is secured to the upper end of a vertical spindle 38 which is adapted to be rotated intermittently to cause the solutions to be thrown quickly from the plate, and is also adapted to be lowered as will be hereinafter described to cause the second or reëxposure to be made on the plate. This spindle may be supported for rotary and endwise movement in one or more bearings carried by the casing 15 or frame 30. At the upper end of the spindle, there is provided a retaining device 39 for preventing the plate being thrown by centrifugal force from the disk. This device includes a plurality of upright fingers 39$^a$ which are located just beyond the disk and extend vertically upward above the disk 35, as best shown in Figs. 4 and 8, this member 39 being provided with a tubular shank or sleeve which extends downward a distance along the spindle 38. The disk 35 and plate retaining device 39 are normally inclosed within a cup 40 which is normally and until after a predetermined point is reached in the finishing process held upwardly against the bottom of the camera box 16. A circular plate 16$^a$, irregular in cross section, is engaged by the top of this cup and renders the joint between the cup and the camera box light tight. The cup 40 is provided with a tubular shank portion 40$^a$ which extends downwardly for a distance along the spindle 38 and between the tubular shank 40$^a$ and the spindle is a tube 40$^b$ which is spaced from the shank 40, and from the spindle as best shown in Figs. 4 and 9. The inner and outer tubes 40ª and 40ᵇ are connected at their upper and lower ends by what may be termed bearing heads 40ᶜ and 40ᵈ, and these parts, as well as the tubes 40 and 40ᵇ are stationary, as far as rotary movement is concerned,—the spindle and with it the disk 35 and fingered disk retaining device 39 being the parts which are adapted to be rotated. Although the spindle, disk 35, and disk retaining device 39 are rotated in unison by means hereinafter referred to, the spindle has a pin and slot connection with the sleeve of the retaining device 39, as best shown in Fig. 9, so as to enable the spindle to move longitudinally relative to the device 39.

After the exposed plate has been deposited on the disk 35, the plate is ready to receive and does immediately after it reaches the disk 35, receive the first of the finishing solutions.

As before stated, I employ the so-called reëxposure or redeveloping process for producing directly from the sensitized plate, the positive picture. I utilize simply three different solutions, one being the rinsing solution, and the other two being the solutions which actually finish the plate into the positive picture. The solutions which I employ consist of a developer solution, an ordinary rinsing liquid which may consist of water, and a solution which I term a bleach. These solutions are contained in three containers 42, 43 and 44 which are preferably of different sizes, as shown in several figures of the drawing,—the developer solution being contained in the container 42, the rinsing solution in container 43, and the bleach solution in the container 44. Each of these containers consists of an inverted bottle which is pressed down by suitable clamping means 45 against a rubber seal or gasket 46 provided in the flaring mouth of a receptacle 47 composed of an upper compartment 47ª into which the neck of the bottle projects, and a lower compartment 47ᵇ which communicates with the upper compartment through a small opening 47ᶜ and which contains a flexible diaphragm 47ᵈ connected at its center with a plunger 47ᵉ which extends downward from the compartment 47ᵇ through a tubular boss. Connected to the three compartments 47ᵇ respectively, are three solution carrying tubes 48 which extend forwardly through the rear wall of the camera box and terminate just below the platform 21ª, as best shown in Fig. 4. The forward ends of the tubes are provided with elbows which direct the solutions downward so that they will fall upon the plate resting face upward on the disk 35. The sensitized plate which I employ is preferably provided at its periphery with a raised edge and constitutes in effect a shallow receptacle with a rim which enables a certain quantity of the solution to be deposited on the plate and which retains a sufficient amount of solution to allow the latter to completely cover the face of the plate.

It will be seen that if any one of the plungers 47ᵉ is lifted a predetermined distance, the upward movement of the diaphragm will cause a predetermined quantity of solution to be forced through the tube and deposited onto the plate.

To operate the plungers which cause the solutions to be forced through the tubes and to be deposited on the plate, I employ three cam disks 50, 51 and 52, which are secured to the motor driven shaft 31 and are located respectively beneath the plungers 47ᵉ associated with the three solution containers 42, 43 and 44. These cam disks are provided on their peripheries with cam teeth or projections which are adapted to engage projections on three lever arms 50ª, 51ª and 52ª respectively, said lever arms being loosely mounted upon the rod 29 in the planes of the three disks, and also being connected respectively by arms 50ᵇ, 51ᵇ and 52ᵇ, to the plungers 47ᵉ of the three solution receptacles. Each time a tooth on one of the cam disks engages a lever arm, the plunger of one of the receptacles will be raised against the tension of a spring 47ᶠ surrounding the plunger, causing the predetermined amount of solution to be deposited on the plate. Immediately after the cam tooth passes beyond the projection on the lever arm, the plunger is lowered by the spring.

The plate while resting on the disk 35 receives the solutions from the three containers in the following order: first, the developing solution or developer, which develops the exposed portion of the plate; thence the rinsing solution or rinse; thence the bleaching solution or bleach which bleaches or dissolves the developed portion of the plate; thence the rinsing solution; thence after a second exposure in a manner hereinafter referred to, the developer which develops the portion of the plate exposed by the second exposure; and thence finally the rinsing solution. Consequently, in the finishing of the picture, the developer is applied twice to the plate, the bleaching solution is applied once; and the rinsing solution is applied three times. Therefore the cam disk 50 is provided with two cam teeth which during the finishing of the picture cause the plunger of the developer receptacle to be operated twice; the cam disk 51 is provided with three cam teeth, which cause the plunger of the rinsing receptacle to be operated three times; and the cam disk 52 is provided with one cam tooth which causes the plunger corresponding to the bleach receptacle to be operated once.

As before stated, each solution is removed from the plate prior to the depositing thereon of the next solution, by spinning the spindle 38 and disk 35 upon which the plate rests. As the solutions are deposited on the disks six times, it is necessary to spin the disk intermittently six times during the finishing of the picture. This is accomplished in the following manner: By referring to Figs. 1, 2 and 6, it will be seen that the spindle 38 is connected by a feather or by a pin and slot connection with a wheel 53 which is held between the ends of a bifurcated arm $53^a$ extending from the frame 30, as shown in Fig. 6, and which is at all times in frictional driving engagement with a second wheel $53^b$ rotatably supported in a frame $53^c$ which is supported for rocking movement about the axis of the spindle 38. The frame $53^c$ is adapted to be swung in a horizontal direction so as to cause the wheel $53^b$ to be brought into frictional driving engagement with the friction wheel 27 on the shaft of the motor 24, and it is normally retained out of engagement with said friction wheel 27 by a spring $53^d$ connected to the frame $53^c$ and to the arm $53^a$ as shown in Fig. 6. Therefore to cause the spindle to rotate, it is only necessary to bring the friction wheel $53^b$ into engagement with the rapidly rotating friction wheel 27 of the motor, and the wheel $53^b$ has only to touch the wheel 27, to cause the spindle 38 to be rotated at extremely high speed. The frame $53^c$ is adapted to be swung intermittently so as to intermittently drive the spindle 38 by mechanism including a cam disk 55, (see particularly Fig. 4), which is secured to the shaft 31 and which is provided on its periphery with six cam teeth $55^a$ which are adapted to engage the end of a lever $55^b$ loosely mounted on the rod 29. This lever is in the form of a bell crank, one arm of which is substantially horizontal, and the other arm of which is substantially vertical, the vertical arm being connected by a rod $55^c$ to the frame $53^c$, as best shown in Figs. 4 and 6. By properly spacing these cam teeth, at the proper intervals of time the spindle will be set into rapid rotation, which spins the sensitized plate and causes the solutions which have been successively deposited on that plate to be quickly and forcibly thrown from the plate against the walls of the surrounding cup 40. The fingers $39^a$ of the plate retainer prevent the plate being thrown off the disk 35 and prevent the plate being moved even any material distance from its central position on the disk. By this important feature of my invention, the liquid is removed from the plate almost instantly, and after the rotation has ceased, there only remains a very thin film of the solution on the plate. This method of freeing the plate of the solution is far superior to other methods which have been employed heretofore, such as tipping the plate, or lifting it from a bath, for with all prior methods of which I am aware, the solution is not removed uniformly from all parts of the plate, but there usually remains in some part of the plate, portions of the solution which prevent the attainment of good results.

The solution which is forced from the plate by centrifugal force as above described, is caught in the surrounding cup 40 and passes downwardly into the annular space between the tubes $40^a$ and $40^b$, and is carried away by a drain tube 56 which is connected to the lower end of said annular space, as shown in Fig. 4.

For carrying out the reëxposure or redevelopment process, it is of course essential that the plate be given a second exposure, after the portions exposed by the first exposure are developed. I accomplish this in a very effective manner without the necessity for a lamp or light producing means used solely for the purpose of the second exposure, and this part of my invention will next be explained.

To cause the second exposure after the first exposure and after the developer has been applied to the plate, the plate is exposed a second time by simply lowering the plate-holding disk 25, together with the spindle 38, the surrounding cup 40, and the parts immediately inclosed by the cup and its tubular shank $40^a$, these parts being lowered as a unit away from the lower part of the camera box to substantially the position shown by dotted lines in Fig. 1, or to a position such that an exposure may be had by light passing into the casing 15 through the glass front $15^a$, it being immaterial whether this is natural light or light produced by artificial means on the exterior of the casing. To lower these parts, I provide on the shaft 31 a cam disk 57 having arc-shaped peripheral portions of two different radii engaged by a roller $57^a$ (see Fig. 4), which is carried by a lever arm $57^b$ pivotally supported on the rod 29. The lower forward end of the arm $57^b$ is connected by a link $57^c$ to a short arm of a bell crank 59 which is loosely or pivotally mounted upon the shaft 31 and has a long arm extending forwardly and connected at its forward end by a pin and slot connection with the lower end of the tubular members above described, which are adapted to be moved vertically with the spindle, disk and plate supported thereon, as before described. When the roller $57^a$ is in engagement with the raised part of the cam disk 57, the cup, spindle, disk 35, etc., are supported in their uppermost positions, as shown in Fig. 4 with the cup in engagement with the sealing device at the lower end of the camera box, and when the roller is in engagement with the reduced portion of the cam disk 57, the said parts are lowered as above described, preferably by gravity, and all the parts will be subsequently raised when the roller again engages the enlarged part of the cam disk.

I prefer that the cup and associated parts be lowered after the bleaching solution has been applied to the plate, and before it has been thrown from the plate, although it is a matter of no consequence whether the plate be given the second exposure before or after the bleaching solution has been applied or thrown from the plate. I prefer, however, in order to effect a saving in time, to lower the plate immediately after the bleaching solution has been applied thereto. The plate remains in lowered position throughout the rest of the finishing process, the developer being added to the plate the second time, and then after the developer has been removed from the plate by spinning it, the plate is rinsed for the last time, this step being the last of the finishing process.

The plate has now been changed to a positive picture and there yet remains to be accomplished the ejection of the picture from the disk and cup through a slot or chute 60 extending through the front wall of the casing into a receptacle 60ª on the exterior thereof. This is accomplished by the following mechanism: It will be noted particularly in Figs. 4 and 8 that the lower part of the plate retaining device 39 carries a pair of curved ejecting fingers 61 which are pivotally connected to the plate retaining device 39, and extend outwardly beyond the disk, and that one of the fingers (the two fingers being formed of one integral piece of wire) passes loosely through a loop 61ª on the lower part of the disk 35, which disk has a pair of slots 35ª through which the two fingers may be thrown upwardly above the disk, (see Fig. 8). It will be seen that if the spindle 38 and disk 35 are lifted relative to the retaining device 39, the fingers will be swung upwardly, and that if, prior to the upward swinging movement, the fingers extend in a direction as shown in Fig. 4, when they are thrown upwardly, they will throw the finished picture forwardly into the chute 60 which is provided to receive it.

To elevate the spindle and disk 35 in the manner stated, while the cup and other associated parts remain in lowered position, I provide on the spindle 31 close to the cam disk 57, a cam disk 62 having a peripheral notch 62ª, (see Fig. 1). The periphery of this cam disk 62 is engaged by a small roller 62ᵇ carried by a substantially vertically disposed arm 62ᶜ which extends downwardly to the lower end of the frame, and at its lower end is connected to a forwardly projecting lever arm 62ᵈ which is normally pressed upwardly with the roller in engagement with the periphery of the cam disk 62 by means of a spring 62ᵉ. The forward end of this lever 62ᵈ is beneath the spindle, and the parts are so arranged that when the roller enters the notch 62ª of the cam disk 62, this lever arm 62ᵈ is swung upwardly so as to elevate the spindle and disk relative to the cup 40 and retaining device 39, and relative to the tubular members 40ª, etc., through which the spindle extends. This lever not only elevates the spindle, but it has a further function of turning the spindle to a position such that the ejecting finger will be properly positioned prior to being lifted or swung upwardly to cause the picture to be thrown into the discharge chute 60. This is accomplished by providing on the lower end of the spindle a tapered member 63 consisting of a cylindrical shell cut diagonally from one side to the other, so as to be tapered substantially to a point. The result of this construction is that as the lever arm 62ᵈ is raised to engage the positioning member 63, and if the fingers do not point in precisely the right direction to throw the picture into the chute, the lever will by engagement with the inclined or tapered edges of the member 63, turn the same so that the ejecting fingers 61 will extend in the proper direction prior to the elevation of the spindle and disk. This is a matter of much importance, particularly with the spindle which is adapted to be spun,—for without the positioning device, the finished picture would probably not be thrown in the proper direction, for the spindle on stopping would very likely not stop in such a position that the fingers 61 would be properly located to eject the picture into the chute.

As soon as the picture is ejected, the cup and its associated parts are elevated to the position shown in Fig. 1, and finally the motor, and consequently all the motor driven parts are brought to a stop by the automatic closing of the switch 22. This is accomplished by the rocking of the lever 23ª which was previously referred to, by a member 64 which is secured to the cam disk 52, and projects from the side thereof, as will be seen from Figs. 3, 4, and 6, so as to engage the lower end of the lever 23ª which through the parts 23, and 23ᵇ was previously rocked about its pivotal axis through the action of the coin controlled slide mechanism. In other words, upon the actuation of the slide mechanism by the operator, the rear end of the lever 23ª is lowered into the path of movement of this projecting member 64, and when the parts on the shaft 31, including the cam disk 52 have made substantially one complete rotation, the member 64 engages the lowered end of the lever 23ª, rocks the same or restores the same to its normal position, and by so doing, rocks the bell crank 23 to the position shown in Fig. 4, closes the switch 22 and restores the slide mechanism to its normal position.

The operation of the machine is as follows: The operator after placing the coin in the opening provided for it and by pushing inwardly the slide members causes the lowermost plate in the magazine to be deposited onto the shelf of the camera in the focal plane of the lens. In case natural light is relied upon for exposure, the lamp is not required, but in case it is desired to use artificial light, the slide mechanism when operated also closes the lamp circuit by closing the switch 22, which, as previously stated, is also in the motor circuit. As soon as the operator is ready for the exposure, he will close a push button or other switch, and the closure of this switch starts the motor into operation. The shutter mechanism is now operated and the exposure is made for the predetermined length of time, which as before stated, can be adjusted to suit conditions or requirements. After the first exposure is made, the exposed plate is caused to be delivered to the disk 35, where it is retained throughout the finishing process, and the shutter and shutter operating and controlling parts are restored to normal position and then retained in normal position for the first exposure on the next sensitized plate. As soon as the plate is deposited upon the disk 35, the cam 50 operates the plunger of the developer receptacle, causing a predetermined amount of the developer to be deposited onto the plate. After the developer is on the plate for the required length of time, the cam 55, by rocking the lever 55$^b$, causes vertical spindle 38 to be rotated, and causes the disk 35 and the plate to be spun at high speed with the result that the developer is thrown from the plate by centrifugal force. Immediately after cam 51 rocks the lever 51$^a$, causing the plunger of the rinsing receptacle to be raised, and causing a predetermined amount of rinsing solution to be deposited on the plate. Immediately after this takes place, the plate is again spun so as to throw the rinsing solution from the plate, and as soon as the plate comes to a stop, the bleach is deposited on the plate by the action of the cam 52, rocking the lever 52$^a$ and raising the plunger of the bleach receptacle, and thereby causing a predetermined amount of the bleach to be deposited on the plate. This bleach or bleaching solution dissolves the developed portion of the plate. The plate and disk 35 and the parts associated therewith are now lowered, so that light may pass through the glass wall of the casing onto the plate for the second exposure, the lowering of these parts being brought about by reason of the fact that the roller 57$^a$ rides off of the raised portion of the cam 57, causing the lever arm 59 to be lowered. Immediately after the parts are lowered, as above stated, the bleach is thrown from the plate, after which the rinsing solution is applied and thrown from the plate, which has now been exposed a second time. Next the developer is again applied with the plate still in lowered position, causing the portion of the plate exposed by the second exposure to be developed. The developer is next thrown off the plate by spinning it, and the rinsing solution is again applied and thrown off. This completes the finishing process, the plate having now been converted into a finished positive picture which is ready to be ejected from the machine. By the action of the cam 62, the lever 62$^b$ first turns the spindle slightly so as to position the ejecting fingers and then raises the spindle and with it the disk and plate, swinging upwardly the ejecting fingers which cause the picture to be thrown into the discharge chute and into the receptacle 60$^a$, upon the exterior of the casing. The projection 64 on the cam 52 now rocks the lever arm 23$^a$, which through the rod 23$^b$ and bell crank 23 restores the slide mechanism to normal position and closes the switch 22 which stops the motor. The machine has now passed through the complete cycle of movement and has completed the series of steps of the process, and all parts are restored to normal positions ready for the next photographing and finishing process.

It will be seen that, as compared with prior machines of this character, in the construction of my improved machine, there are few parts, and that there are no complicated mechanisms or intricate movements. Furthermore, very good results are obtained with this machine and the entire photographing and finishing process is carried out very quickly. In fact less than a minute elapses between the closing of the switch which starts the motor into operation and the ejection of the finished picture from the machine.

While I have described only one form of my invention, it will be obvious that certain changes can be made in the details of construction, and I do not desire to be confined to any particular details except so far as I am expressly limited by the terms of the appended claims.

Having described my invention, what I claim is:

1. In an automatic photographing apparatus, a camera, apparatus for finishing the plate and means for causing the plate to pass from the camera to the finishing apparatus, said finishing apparatus comprising means for applying a solution to the plate, and means for spinning the plate to cause the solution to be thrown therefrom by centrifugal force.

2. In an automatic photographing apparatus, means for causing a photographic exposure to be made on a sensitized plate, a support adapted to receive the plate after the exposure, means for causing the delivery of the exposed plate to said support, means for applying a finishing solution to the plate, and means for spinning said support to throw the solution from the plate.

3. In an automatic photographing apparatus, means for causing a photographic exposure to be made on a sensitized plate, a support adapted to receive the plate after the exposure, means for causing the exposed plate to pass to said support, means for applying finishing solutions to the plate and means for spinning said support intermittently to cause the solutions to be thrown from the plate.

4. In combination in an automatic photographing apparatus, a camera for causing a photographic exposure to be made on a sensitized plate, a support for the plate, means for causing the delivery of the exposed plate from the camera to said support, means for causing a plurality of solutions to be successively applied to the plate, and means for intermittently spinning said support to cause the solution to be thrown from the plate.

5. In an automatic photographing apparatus, means for causing a photographic exposure to be made upon a sensitized plate, a horizontal support adapted to receive and hold the exposed plate, means for causing the delivery of the exposed plate to said support, means for applying successively a plurality of solutions to said plate, and means for intermittently spinning said support to free the plate of the solutions applied to it.

6. In an automatic photographing apparatus, means for causing a photographic exposure to be made on a sensitized plate, an inclosure adapted to receive the exposed plate, means for causing said exposed plate to pass to said inclosure, means for subjecting the exposed plate while in said inclosure to the action of a developing solution, and means for automatically opening the inclosure whereby the plate may be subjected to light from an external source, for causing a second exposure to be made on the plate.

7. In an automatic photographing apparatus, means for causing a photographic exposure to be made on a sensitized plate, a support adapted to receive the plate after the exposure, means for causing the exposed plate to be delivered to said support, an inclosing member surrounding said support, means for causing the plate to be subjected to the action of a developing solution, and means for causing a movement of said support and of the inclosing member whereby the plate may be subjected to the action of actinic rays from an external source.

8. In an automatic photographing apparatus, a camera including a box, a lens holder, and means for holding a sensitized plate in the focal plane of the camera lens, a support beneath said box and adapted to receive the plate from the camera, means for causing the exposed plate to be delivered to said support, means for applying a solution to the plate while on said support, means for spinning the support to free the latter of the solution, and a device surrounding said plate for receiving the solution thrown from the plate.

9. In an automatic photographing apparatus, a camera, a support beneath the camera, means for causing the delivery of an exposed plate from the camera to said support, a cup surrounding the support, means for applying a finishing solution to the plate, while on the support, and means for spinning the plate to cause the solution to be thrown therefrom into said cup.

10. In an automatic photographing apparatus, a camera, a support adapted to receive the plate after an exposure had been made thereon, means for causing the delivery of the plate from the camera to the support, means for causing the plate to be subjected to the action of a finishing solution, means for spinning said support, and means for shifting said support away from the camera.

11. In an automatic photographing apparatus, a camera, a support beneath the camera adapted to receive an exposed plate, means for causing the exposed plate to pass from the camera to said support, means for applying a finishing solution to the plate, means for spinning said support, and means for lowering the support from the camera.

12. In an automatic photographing apparatus, a camera, a support beneath said camera, a vertical spindle for rotating the same, a receptacle surrounding the support, means for causing the plate to pass from the camera to said support, means for applying a finishing solution to the plate, means for spinning the support in the receptacle, and means for lowering the said support and receptacle.

13. In an automatic photographing apparatus, a camera, a support beneath the camera adapted to receive a sensitized plate exposed in the camera, means for causing the plate to pass from the camera to said support, a receptacle surrounding the support, means for causing a finishing solution to be applied to the plate, means for spinning the support in the receptacle, means for lowering the support and the receptacle, and means for elevating the support relative to the receptacle.

14. In an automatic photographing apparatus, a camera, a support beneath the camera, means for causing the delivery of a plate exposed in the camera to said support, a vertical spindle for rotating the support, a receptacle surrounding the support, means for applying a finishing solution to the plate, means for rotating the spindle and support, means for lowering the spindle, support, and receptacle, and means for elevating the spindle and support relative to the receptacle.

15. In an automatic photographing apparatus, a camera, a support adapted to receive a plate after it has received an exposure in the camera, means for causing the plate to pass from the camera to the support, means for successively applying finishing solutions to the plate while on the support, means for spinning the support intermittently, and means for removing the finished picture from said support.

16. In an automatic photographic apparatus, a camera, a support adapted to receive a plate after it has received an exposure in the camera, means for causing the plate to pass from the camera to the support, means for applying finishing solutions to the plate while on the support, means for spinning the support to relieve the plate of the finishing solutions, and means for throwing the plate from the support.

17. In an automatic photographing apparatus, a camera, a support adapted to hold a plate after it has received an exposure in the camera, means for causing the plate to pass from the camera to the support, means for supplying to the plate while on said support a plurality of finishing solutions, means for causing the solutions to be removed from the plate, an inclosing receptacle for the support adapted to receive the solutions from the plate, and means for lowering the support and the receptacle prior to the application of the last solution to the plate.

18. In an automatic photographing apparatus, a camera, a support beneath the camera, means for causing an exposed plate to pass from the camera to said support, a spindle for rotating said support, ejecting means rotatable with the spindle, means for rotating the spindle and support, means for lowering the spindle and support, and separate means for turning said spindle to position the ejecting means and for elevating the spindle.

19. In an automatic photographing apparatus, a camera, a support beneath the camera, a vertical spindle carrying said support adapted to be rotated, a pivoted plate-ejecting means rotatable with said support and spindle, means for lowering the spindle, support, and ejecting means, means for raising the spindle and support and for turning the same to position the ejecting means.

20. In an automatic photographing apparatus, a magazine adapted to contain sensitized plates, a camera, means for causing the delivery of a plate to the camera, a rotary and vertically movable support adapted to receive a plate from the camera, means for causing the delivery of a plate from the camera to the support, a plurality of receptacles for finishing solutions, means for causing the ejection of a plate from said support, and automatic mechanism for causing a photographic exposure to be made on the plate while in the camera, for causing the delivery of a plate from the camera to said support, for causing different finishing solutions to be successively applied to said plate while on the support, for spinning the support after each solution has been applied thereto, for lowering the support prior to the application of the last finishing solution thereto, and for operating said ejecting means.

21. In an automatic photographing apparatus, a camera, a support adapted to receive a plate exposed while in the camera, means for causing the delivery of the plate from the camera to said support, and finishing mechanism including a motor, means for supplying to the plate different finishing solutions, a vertical spindle attached to said support, and means for intermittently forming driving connections between the motor and said spindle for spinning the latter.

22. In an automatic photographing apparatus, a camera, an inclosure adjacent thereto, means for causing a plate which has been exposed in the camera to be delivered to said inclosure, means for causing a finishing solution to be applied to said plate while in said inclosure, and means for causing a movement of the inclosure by which a second exposure may be made on the plate.

23. In an automatic photographing apparatus, a camera, an inclosure beneath the camera, means for causing an exposed plate to be delivered from the camera to the inclosure, means for applying a developing solution to the plate while in said inclosure, and means for causing an opening of said inclosure to permit a second exposure to be made on the plate.

24. In an automatic photographing apparatus, a camera, an inclosure beneath the camera, means for causing an exposed plate to be delivered from the camera to the inclosure, means for applying a developing solution to the plate while in said inclosure, and means for lowering the inclosure whereby a second exposure may be made on the plate.

25. In an automatic photographing apparatus, a camera, an inclosure adjacent the camera, means for causing the delivery of a plate from the camera to the inclosure, means for causing different finishing solutions to be applied successively to the plate while in the inclosure, and means whereby said plate is automatically caused to be exposed to light from an external source for a second exposure.

26. In an automatic photographing apparatus, a camera, a support adapted to receive a plate exposed in the camera, means for causing the delivery of the plate to said support, means for supplying onto the plate a finishing solution, and means for causing the solution to be projected laterally from the plate.

27. In an automatic photographing apparatus, a camera, a support adapted to receive a plate after it has been exposed in the camera, means for causing the delivery of a plate from the camera to the support, means for supplying a finishing solution to the plate, and means for causing the solution to be forcibly thrown therefrom.

28. In an automatic photographing apparatus, a camera, a support adapted to receive a plate after it has been exposed in the camera, means for causing the delivery of the plate from the camera to the support, means for applying a finishing solution to the plate, and means for actuating the plate to cause the solution to be forcibly thrown therefrom.

29. In an automatic photographing apparatus, a camera, a finishing receptacle, means for causing a plate which has been exposed in the camera to be delivered to the receptacle, means for causing a finishing solution to be supplied to the receptacle after the plate is delivered into the latter, and means for causing relative movement between the camera and the receptacle.

30. In an automatic photographing apparatus, a camera, a finishing receptacle, means for causing a plate which has been exposed in the camera to be delivered to the receptacle, means for causing a finishing solution to be supplied to the receptacle after the plate is delivered into the latter, mechanism for causing relative movement between the camera and the receptacle, and an ejector for ejecting the plate from the receptacle.

31. In an automatic photographing apparatus, a camera, a finishing receptacle adapted to receive a plate exposed in the camera, means for causing the delivery of the plate from the camera to the receptacle, means for causing a finishing solution to be supplied to the receptacle after the plate is delivered into the latter, and means for moving the receptacle relative to the camera.

32. In an automatic photographing apparatus, a camera, a finishing receptacle adapted to receive a plate exposed in the camera, means for causing the delivery of the plate from the camera to the receptacle, means for causing a finishing solution to be supplied to the receptacle after the plate is delivered into the latter, means for moving the receptacle relative to the camera, and means for ejecting the plate from the receptacle.

33. In an automatic photographing apparatus, a camera, a finishing receptacle, means for causing the delivery of an exposed plate from the camera to the receptacle, means for causing a finishing solution to be supplied to the receptacle after the plate is delivered into the latter, and mechanism for elevating the plate relative to the receptacle, and for ejecting the plate therefrom.

34. In an automatic photographing apparatus, a camera, a finishing receptacle, means for causing the delivery of an exposed plate from the camera to the receptacle, and mechanism for lowering the plate and receptacle relative to the camera and for subsequently elevating the plate relative to the receptacle.

35. In an automatic photographing apparatus, a finishing receptacle, means for causing the plate to pass from the camera to the receptacle, means for causing a finishing solution to be supplied to the receptacle after the plate is delivered into the latter, means for causing the plate and receptacle to be moved relatively, and an ejector for ejecting the plate, said ejector being operative upon said relative movement.

36. In an automatic photographing apparatus, a camera, a finishing receptacle, mechanism for causing the lowering of the receptacle and plate from the camera, means for causing relative vertical movement between the plate and receptacle, and means for ejecting the plate when it is above the receptacle.

37. In an automatic photographing apparatus, a camera, a finishing receptacle adjacent thereto, means for causing the delivery of an exposed plate from the camera to the receptacle, means for supplying a finishing solution to the receptacle after the plate is delivered into the latter, means for moving the receptacle relative to the camera, and an ejector within the receptacle for ejecting the plate from the latter.

In testimony whereof, I hereunto affix my signature in the presence of two witnesses.

GEORGE N. PIFER.

Witnesses:
A. J. HUDSON,
A. F. KWIS.